United States Patent [19]

Onorati

[11] Patent Number: 4,603,597
[45] Date of Patent: Aug. 5, 1986

[54] DRIVE SYSTEM

[75] Inventor: Frank V. Onorati, Rochester, N.Y.

[73] Assignee: Xerox Corporation, Stamford, Conn.

[21] Appl. No.: 696,561

[22] Filed: Jan. 30, 1985

[51] Int. Cl.⁴ ............... F16H 55/17; F16B 7/00; F16B 21/00; F16D 1/00
[52] U.S. Cl. .................... 74/434; 474/903; 403/383; 403/326
[58] Field of Search .............. 74/434, 411, 446, 447, 74/448; 403/383, 326; 474/902, 903

[56] References Cited

U.S. PATENT DOCUMENTS

| | | | |
|---|---|---|---|
| 1,244,386 | 10/1917 | Spehar | 74/434 |
| 2,842,006 | 7/1958 | Edman | 74/434 |
| 2,862,399 | 12/1958 | Wald, Jr. et al. | 74/448 |
| 3,535,977 | 10/1970 | Baumgarten | 85/808 |
| 4,043,214 | 8/1977 | Westlake | 74/446 |
| 4,043,685 | 8/1977 | Hyams | 403/19 |
| 4,113,397 | 9/1978 | Snyder | 403/326 |
| 4,311,473 | 1/1982 | Sugimoto | 474/160 |
| 4,337,614 | 7/1982 | Briscoe | 59/86 |
| 4,506,559 | 3/1985 | Francke et al. | 74/448 |

Primary Examiner—Kenneth J. Dorner
Assistant Examiner—Mike Bednarek
Attorney, Agent, or Firm—H. Fleischer; J. E. Beck; R. Zibelli

[57] ABSTRACT

A drive system in which a driven member is mounted on a shaft member to rotate in unison therewith. The driven member has a protrusion extending outwardly from one surface thereof. A retaining ring having an open end is mounted on the shaft member. The open end of the retaining ring meshes with the protrusion extending outwardly from the driven member so as to rotate in unison therewith.

10 Claims, 6 Drawing Figures

DRIVE SYSTEM

This invention relates generally to a drive system, and more particularly concerns the use of an open ended retaining ring for securing a driven member to a rotating shaft member.

Generally, a retaining ring is installed in the groove of a shaft to prevent axial displacement relative to the shaft or housing of a machine part mounted adjacent the retaining ring. Typically, the part mounted on the shaft has a D-shaped hole meshing with a circular shaft having a flat thereon. This is a common way of driving a gear, cam or pulley. The retaining ring secures the rotating part on the shaft. There are two basic types of retaining means that are frequently used for this purpose. One type of retaining ring is known as an E-clip type of retaining ring with the other type being a external retaining ring. The external retaining ring usually requires a tool for installation and removal from the groove in the shaft. In contradistinction, an E-clip type retaining ring does not require any tools for installation in the groove of the shaft. Thus, the E-clip type retaining ring is easier to install and saves time of the assembly line. Moreover, this type of retaining ring is easier to service in the field inasmuch as no special tool is required for the removal or installation thereof. However, it has been found that the E-clip type retaining ring rotates relative to the shaft. Under these circumstances, it is possible for this retaining ring to fall off the shaft when it is positioned over the flat on the shaft. Hence, it has been necessary to utilize an external type of retaining ring even though it requires greater installation time and needs a special tool for the installation and removal thereof. Accordingly, it is highly desirable to be capable of using an E-clip type retaining ring in a drive system.

Various approaches have been devised for securing a member to a rotating shaft. The following disclosures appear to be relevant:

U.S. Pat. No. 3,535,977
Patentee: Baumgarten
Issued: Oct. 27, 1970
U.S. Pat. No. 4,043,685
Patentee: Hyams
Issued: Aug. 23, 1977
U.S. Pat. No. 4,337,614
Patentee: Briscoe
Issued: July 6, 1982
U.S. Pat. No. 4,311,473
Patentee: Sugimoto
Issued: Jan. 19, 1982

The relevant portions of the foregoing disclosures may be briefly summarized as follows:

Baumgarten discloses a dual functioning split retaining ring. The ring may be installed in either an outwardly opening groove in a shaft or in an inwardly opening groove in a housing to prevent axial displacement relevant to the shaft or housing of a machine part which is mounted adjacent to the split ring. Each end of the split ring has a pair of keyhole shaped slots. A tool is inserted in the slots and expands the ring until the sharp corners clear the diameter of the groove in the shaft. The ring is then allowed to spring back so that its inner periphery seats snugly against the base of the groove.

Hyams describes a fastener for securing a pram wheel to its axial. The fastener has a locking plate on a stud with a lateral recess. The plate is prohibited from rotating by a peg. Within the frame of the plate are two locking posts. The posts embrace the axial when it is located therebetween.

Briscoe discloses a pin locking assembly which employs a plate with an aperture therein. The aperture allows the plate to be moved over the zonal portion of the pin. The locking device is completed by employing a snap ring and a slug. The plate is then fixed in a non-removable condition relative to the pin.

Sugimoto describes a retaining device for a multistage sprocket assembly. The retaining device has an engagable groove extending circumferentially on a shaft and an engaging member elastically engagable with and disengagable from the groove. The engaging member is engaged with the groove to mount the sprocket group axially relative to the shaft member. The engaging member employs holding faces which engage the sprocket. The holding faces have circular apertures. The aperatures are directly engaged with the sprocket.

In accordance with one aspect of the features of the present invention, there is provided a drive system including a shaft member. A driven member is adapted to be mounted on the shaft member and rotates in unison therewith. The driven member has a protrusion extending outwardly from one surface thereof. A retaining ring having an open end is mounted on the shaft member. The open end of the retaining ring is arranged to mesh with the protrusion extending outwardly from the driven member so as to rotate in unison therewith.

Other aspects of the present invention will become apparent as the following description proceeds and upon reference to the drawings in which.

While the present invention will hereinafter be described in conjunction with various embodiments thereof, it will be understood that it is not intended to limit the invention to these embodiments. On the contrary, it is intended to cover all alternatives, modifications, and equivalents as may be included within the spirit and scope of the invention as may be defined by the appended claims.

Figure 1:
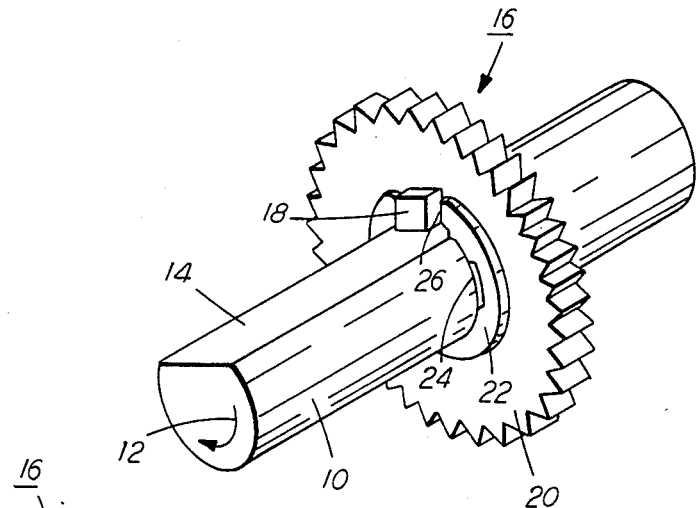
FIG. 1 is a schematic prospective view illustrating the drive system of the present invention.

For a general understanding of the features of the present invention, reference is made to the drawing. In the drawing, like reference numerals have been used throughout to identify identical elements. FIG. 1 schematically depicts the various components of the drive system of the present invention. It will become apparent from the following discussion that this type of drive system may be utilized with any type driven element for use in a wide variety of machines, and is not necessarily limited in its application to the particular embodiment shown herein.

Referring now to FIG. 1, there is shown a fragmentary prospective view of the drive system. The drive system includes a shaft 10 coupled to a motor (not shown). Shaft 10 rotates in the direction of arrow 12.

Shaft 10 is D-shaped, i.e. cylindrical having a flat surface 14 thereon. A driven member, indicated generally by the reference numeral 16, is mounted on shaft 10. By way of example, driven member 16 is shown as a gear. One surface of gear 16 abuts a shoulder (not shown) on shaft 10. Gear 16 includes a protrusion or boss 18 extending outwardly from surface 20 thereof. An E-clip type retaining ring 22 is mounted in groove 24 of shaft 10. In order to install retaining ring 22 in groove 24 on shaft 10, retaining ring 22 is expanded until the corners of open end 26 clear the diameter of the groove. Then retaining ring 22 is allowed to spring back so that the interior perpherial edge seats snugly against the base of groove 24. Open end 26 of retaining ring 22 meshes with protrusion 18. Thus, protrusion 18 of gear 16 fits into open end 26 of retaining ring 22. Gear 20 has a D-shaped opening so as to fit on shaft 10.

In operation, shaft 10 rotates in the direction of arrow 12. Flat 14 of shaft 10 engages the corresponding flat on the interior surface of gear 16 driving gear 16 in the direction of arrow 12. As gear 16 rotates in the direction of arrow 12, protrusion or boss 18 drives retaining ring 22 causing it to rotate in the direction of arrow 12. Thus, shaft 12, gear 16 and retaining ring 22 rotate in unison with one another. This prevents relative movement of retaining ring 22 with respect to shaft 10. Inasmuch as there is no relative movement between retaining ring 22 and shaft 10, retaining ring 22 cannot be positioned over flat 14. In this way, retaining ring 22 is prevented from falling off shaft 10 and continually engages gear 16 to maintain gear 16 on shaft 10, as well.

Figure 2:
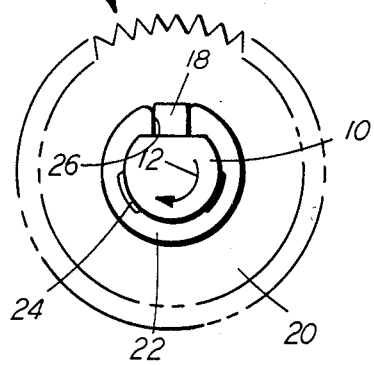
FIG. 2 is an elevational view showing the FIG. 1 drive system.

Turning now to FIG. 2, there is shown an elevational view of the drive system. As shown thereat, gear 16 is mounted on shaft 10. The surface of gear 16 opposed to surface 20 engages a flange on shaft 10. Boss 18 extends outwardly from surface 20 of gear 16. Retaining ring 22 is mounted in groove 24 of shaft 10 and in engagement with gear 16. In this way, retaining ring 22 resiliently forces gear 16 against the flange of shaft 10. Boss 18, extending outwardly from surface 20 of gear 16, fits into open end 26 of retaining ring 22. Hence, shaft 10, gear 16, and retaining ring 22 rotate in unison with one another.

Figure 3:
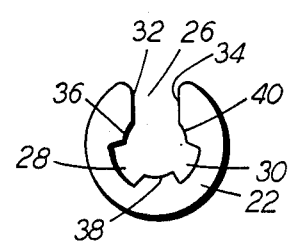
FIG. 3 is an elevational view depicting the retaining ring used in the FIG. 1 drive system.

Referring now to FIG. 3, there is shown retaining ring 22 in greater detail. Retaining ring 22 is an E-shaped retaining ring having an open end 26. The interior diameter of retaining ring 22 is adapted to fit into groove 24 of shaft 10. Retaining ring 22 has two cut out regions 28 and 30. These cut out regions facilitate the expansion of retaining ring 22 so as to enable ends 32 and 34 thereof to clear shaft 10 when retaining ring 22 is being placed in groove 24 thereof. By forming cut outs 28 and 30 in retaining ring 22, retaining ring 22 has only regions 36, 38 and 40 in engagement with shaft 10. Thus, it is seen that if retaining ring 22 were to rotate relative to shaft 10, one of the regions 36, 38, or 40 could be positioned over flat 14 of shaft 10 causing retaining ring 22 to fall off shaft 10, thereby freeing gear 16. However, inasmuch as boss 18 of gear 16 fits into open end 26 of retaining ring 22, retaining ring 22 rotates in unison with shaft 10 and gear 16. Under these circumstances, retaining ring 22 has no relative movement with respect to shaft and regions 36, 38, and 40 remain fixed with respect to shaft 10. This insures that regions 36, 38, and 40 can never be located over flat 14 of shaft 10.

Figure 4:
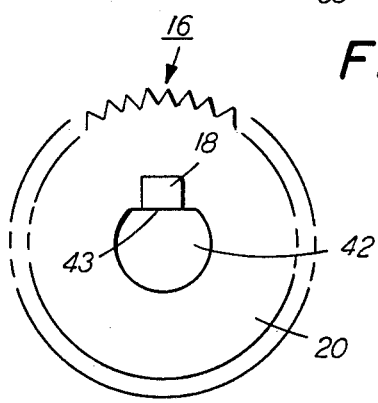
FIG. 4 is a front elevational view depicting an exemplary gear used in the FIG. 1 drive system.

Turning now to FIG. 4, there is shown gear 16 in greater detail. As depicted thereat, gear 16 includes a boss 18 extending outwardly from surface 20. Opening 42 in gear 16 is D-shaped and adapted to interfit or mesh with shaft 10. Surface 14 of shaft 10 engages surface 43 of gear 16 so as to drive gear 16 in unison therewith.

Figure 5:
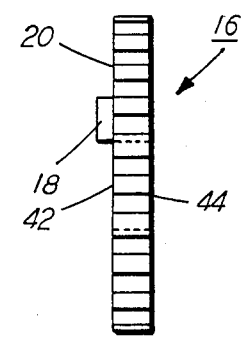
FIG. 5 is a side elevational view of the FIG. 4 gear.

FIG. 5 is a side elevational view of gear 16. As shown thereat, boss 18 extends outwardly from surface 20. The D-shaped hole 42 extends through gear 16 from surface 20 to surface 44. Surface 44 of gear 16 is adapted to engage the flange on shaft 10. Alternatively, one skilled in the art will appreciate that a retaining ring may be employed in lieu of the flange on shaft 10. Under these circumstances, a boss would extend from both sides of gear 16.

Figure 6:
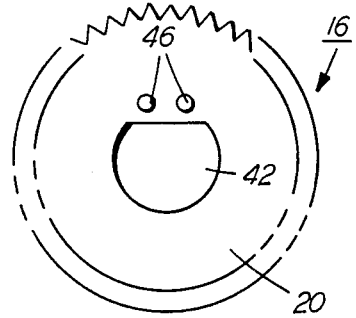
FIG. 6 is another embodiment of an exemplary gear used in the FIG. 1 drive system.

Referring now to FIG. 6, there is shown another embodiment of gear 16. As shown thereat, gear 16 has a D-shaped opening 42 extending through the center thereof. In lieu of a boss, a pair of pins 46 extend outwardly from surface 20. These pins fit into open end 26 of retaining ring 22. Pins 46 act in the same manner as boss 18, i.e. they prevent movement of retaining ring 22 relative to shaft 10. Thus, retaining ring 22 is positioned on shaft 10 in a fixed, preferred position. Shaft 10, retaining ring 22, and gear 16 rotate in unison with one another.

In recapitulation, it is clear that the drive system of the present invention utilizes a protrusion extending outwardly from one surface of the driven member. The protrusion meshes with the open end of the retaining ring to lock the retaining ring in a fixed position with respect to the driving shaft. In this way, the driven member, drive shaft, and retaining ring all rotate in unison with one another. This prevents relative movement of the retaining ring with respect to the drive shaft insuring that the retaining ring can never fall off the drive shaft, thereby freeing the driven member.

It is, therefore, apparent that there has been provided, in accordance with the present invention, a drive system which fully satisfies the aims and advantages hereinbefore set forth. While this invention has been described in conjunction with various embodiments thereof, it is evident that many alternatives, modification, and variations will be apparent to those skilled in the art. Accordingly, it is intended to embrace all such alternatives, modifications, and variation as fall within the spirit and broad scope of the claims.

I claim:

1. A drive system, including:
   a shaft member;
   a unitary driven member adapted to be mounted on said shaft member to rotate in unison therewith, said driven member having a protrusion extending outwardly from one surface thereof; and
   an annular split retaining ring having opposed free ends defined by the split in the ring, said retaining ring mounted removably on said shaft member with the free ends thereof meshing with the protrusion extending outwardly from said driven member so as to rotate in unison therewith.

2. A drive system according to claim 1, wherein said shaft member includes a groove extending about the exterior surface thereof with said retaining ring being mounted in said groove.

3. A drive system according to claim 2, wherein said retaining ring includes a plurality of cut outs on the interior surface thereof so that a plurality of regions interfit into the groove in said shaft member.

4. A drive system according to claim 3, wherein said retaining ring is resilient with said retaining ring being deflected when mounted in said groove of said shaft member so as to be in resilient contact therewith.

5. A drive system according to claim 4, wherein the interior surface of said retaining ring is E-shaped.

6. A drive system according to claim 5, wherein said shaft member includes at least one flat surface.

7. A drive system according to claim 6, wherein said driven member includes an interior aperture having a at least one flat surface adapted to mesh with the flat surface of said shaft member.

8. A drive system according to claim 7, wherein said protrusion on said driven member includes a plurality of pins.

9. A drive system according to claim 7, wherein said protrusion on said drive member includes a boss.

10. A drive system according to claim 7, wherein said driven member is a gear.

* * * * *